US009641898B2

(12) United States Patent
Bloch et al.

(10) Patent No.: US 9,641,898 B2
(45) Date of Patent: May 2, 2017

(54) METHODS AND SYSTEMS FOR IN-VIDEO LIBRARY

(71) Applicant: JBF Interlude 2009 LTD—Israel, Tel Aviv-Jaffa (IL)

(72) Inventors: Jonathan Bloch, Brooklyn, NY (US); Barak Feldman, Tenafly, NJ (US); Tal Zubalsky, Tel Aviv-Jaffa (IL); Yuval Hofshy, Kfar Saba (IL)

(73) Assignee: JBF Interlude 2009 LTD (IL)

( * ) Notice: Subject to any disclaimer, the term of this patent is extended or adjusted under 35 U.S.C. 154(b) by 0 days.

(21) Appl. No.: 14/139,996

(22) Filed: Dec. 24, 2013

(65) Prior Publication Data

US 2015/0181301 A1    Jun. 25, 2015

(51) Int. Cl.
| | | |
|---|---|---|
| G06F 3/00 | (2006.01) | |
| G06F 13/00 | (2006.01) | |
| H04N 5/445 | (2011.01) | |
| H04N 21/472 | (2011.01) | |
| H04N 21/45 | (2011.01) | |

(52) U.S. Cl.
CPC ... *H04N 21/47217* (2013.01); *H04N 21/4524* (2013.01); *H04N 21/4532* (2013.01); *H04N 21/47202* (2013.01)

(58) Field of Classification Search
USPC .................... 725/38, 41, 44, 50, 52, 61, 100
See application file for complete search history.

(56) References Cited

U.S. PATENT DOCUMENTS

| | | | |
|---|---|---|---|
| 5,568,602 | A | 10/1996 | Callahan et al. |
| 5,607,356 | A | 3/1997 | Schwartz |
| 5,636,036 | A | 6/1997 | Ashbey |
| 5,734,862 | A | 3/1998 | Kulas |
| 5,818,435 | A | 10/1998 | Kozuka et al. |
| 6,122,668 | A | 9/2000 | Teng et al. |
| 6,128,712 | A | 10/2000 | Hunt et al. |
| 6,191,780 | B1 | 2/2001 | Martin et al. |
| 6,222,925 | B1 | 4/2001 | Shiels et al. |

(Continued)

FOREIGN PATENT DOCUMENTS

| | | |
|---|---|---|
| DE | 10053720 A1 | 4/2002 |
| EP | 1033157 A2 | 9/2000 |

(Continued)

OTHER PUBLICATIONS

An ffmpeg and SDL Tutorial, "Tutorial 05: Synching Video," Retrieved from internet on Mar. 15, 2013: <http://dranqer.com/ffmpeg/tutorial05.html>, (4 pages).

(Continued)

*Primary Examiner* — Mulugeta Mengesha
(74) *Attorney, Agent, or Firm* — Goodwin Procter LLP (57) ABSTRACT

Method and accompanying system for providing an in-video library. A video player presents a video stream to a user. During presentation of the video stream, the video player displays at least a portion of a library of selectable prerecorded video segments, and a selection of one or more of the prerecorded video segments from the library is received from the user. The video player further displays a video segment watch-list that includes the selected prerecorded video segments. The video player then presents the segments in the video segment watch-list as part of the video stream.

24 Claims, 4 Drawing Sheets

(56) References Cited

U.S. PATENT DOCUMENTS

| | | | |
|---|---|---|---|
| 6,298,482 B1 | 10/2001 | Seidman et al. | |
| 6,728,477 B1 | 4/2004 | Watkins | |
| 6,801,947 B1 | 10/2004 | Li | |
| 7,155,676 B2 | 12/2006 | Land et al. | |
| 7,310,784 B1 | 12/2007 | Gottlieb et al. | |
| 7,379,653 B2 | 5/2008 | Yap et al. | |
| 7,444,069 B1 | 10/2008 | Bernsley | |
| 7,627,605 B1 | 12/2009 | Lamere et al. | |
| 7,917,505 B2 | 3/2011 | van Gent et al. | |
| 8,065,710 B2 | 11/2011 | Malik | |
| 8,190,001 B2 | 5/2012 | Bernsley | |
| 8,276,058 B2 | 9/2012 | Gottlieb et al. | |
| 8,281,355 B1 | 10/2012 | Weaver et al. | |
| 8,600,220 B2 | 12/2013 | Bloch et al. | |
| 8,650,489 B1 | 2/2014 | Baum et al. | |
| 8,860,882 B2 | 10/2014 | Bloch et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,190,110 B2 | 11/2015 | Bloch | |
| 9,257,148 B2 | 2/2016 | Bloch et al. | |
| 9,271,015 B2 | 2/2016 | Bloch et al. | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0177914 A1 | 11/2002 | Chase | |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0138948 A1 | 7/2004 | Loomis | |
| 2004/0172476 A1 | 9/2004 | Chapweske | |
| 2005/0019015 A1 | 1/2005 | Ackley et al. | |
| 2005/0055377 A1 | 3/2005 | Dorey et al. | |
| 2005/0091597 A1* | 4/2005 | Ackley | 715/716 |
| 2005/0102707 A1 | 5/2005 | Schnitman | |
| 2006/0028951 A1 | 2/2006 | Tozun et al. | |
| 2006/0064733 A1 | 3/2006 | Norton et al. | |
| 2006/0150072 A1 | 7/2006 | Salvucci | |
| 2006/0155400 A1 | 7/2006 | Loomis | |
| 2006/0200842 A1* | 9/2006 | Chapman et al. | 725/34 |
| 2006/0224260 A1 | 10/2006 | Hicken et al. | |
| 2007/0024706 A1 | 2/2007 | Brannon et al. | |
| 2007/0033633 A1 | 2/2007 | Andrews et al. | |
| 2007/0118801 A1 | 5/2007 | Harshbarger et al. | |
| 2007/0157261 A1 | 7/2007 | Steelberg et al. | |
| 2007/0162395 A1 | 7/2007 | Ben-Yaacov et al. | |
| 2007/0239754 A1 | 10/2007 | Schnitman | |
| 2008/0021874 A1 | 1/2008 | Dahl et al. | |
| 2008/0022320 A1 | 1/2008 | Ver Steeg | |
| 2008/0031595 A1 | 2/2008 | Cho | |
| 2008/0086754 A1 | 4/2008 | Chen et al. | |
| 2008/0091721 A1 | 4/2008 | Harboe et al. | |
| 2008/0092159 A1 | 4/2008 | Dmitriev et al. | |
| 2008/0148152 A1* | 6/2008 | Blinnikka et al. | 715/719 |
| 2008/0276157 A1 | 11/2008 | Kustka et al. | |
| 2008/0300967 A1 | 12/2008 | Buckley et al. | |
| 2008/0301750 A1 | 12/2008 | Silfvast et al. | |
| 2008/0314232 A1 | 12/2008 | Hansson et al. | |
| 2009/0022015 A1 | 1/2009 | Harrison | |
| 2009/0024923 A1 | 1/2009 | Hartwig et al. | |
| 2009/0055880 A1 | 2/2009 | Batteram et al. | |
| 2009/0063681 A1 | 3/2009 | Ramakrishnan et al. | |
| 2009/0116817 A1 | 5/2009 | Kim et al. | |
| 2009/0199697 A1 | 8/2009 | Lehtiniemi et al. | |
| 2009/0228572 A1 | 9/2009 | Wall et al. | |
| 2009/0320075 A1 | 12/2009 | Marko | |
| 2010/0017820 A1* | 1/2010 | Thevathasan | G11B 27/036 725/35 |
| 2010/0042496 A1 | 2/2010 | Wang et al. | |
| 2010/0077290 A1 | 3/2010 | Pueyo | |
| 2010/0146145 A1 | 6/2010 | Tippin et al. | |
| 2010/0153512 A1 | 6/2010 | Balassanian et al. | |
| 2010/0161792 A1 | 6/2010 | Palm et al. | |
| 2010/0167816 A1 | 7/2010 | Perlman et al. | |
| 2010/0186579 A1 | 7/2010 | Schnitman | |
| 2010/0262336 A1 | 10/2010 | Rivas et al. | |
| 2010/0268361 A1 | 10/2010 | Mantel et al. | |
| 2010/0278509 A1 | 11/2010 | Nagano et al. | |
| 2010/0287033 A1* | 11/2010 | Mathur | 705/10 |
| 2010/0287475 A1 | 11/2010 | van Zwol et al. | |
| 2010/0293455 A1 | 11/2010 | Bloch | |
| 2010/0332404 A1 | 12/2010 | Valin | |
| 2011/0007797 A1 | 1/2011 | Palmer et al. | |
| 2011/0010742 A1 | 1/2011 | White | |
| 2011/0026898 A1 | 2/2011 | Lussier et al. | |
| 2011/0096225 A1 | 4/2011 | Candelore | |
| 2011/0126106 A1 | 5/2011 | Ben Shaul et al. | |
| 2011/0131493 A1 | 6/2011 | Dahl | |
| 2011/0138331 A1 | 6/2011 | Pugsley et al. | |
| 2011/0191684 A1* | 8/2011 | Greenberg | 715/719 |
| 2011/0197131 A1 | 8/2011 | Duffin et al. | |
| 2011/0200116 A1 | 8/2011 | Bloch et al. | |
| 2011/0202562 A1 | 8/2011 | Bloch et al. | |
| 2011/0246885 A1 | 10/2011 | Pantos et al. | |
| 2011/0252320 A1 | 10/2011 | Arrasvuori et al. | |
| 2011/0264755 A1 | 10/2011 | Salvatore De Villiers | |
| 2012/0005287 A1 | 1/2012 | Gadel et al. | |
| 2012/0094768 A1 | 4/2012 | McCaddon et al. | |
| 2012/0110620 A1 | 5/2012 | Kilar et al. | |
| 2012/0198412 A1 | 8/2012 | Creighton et al. | |
| 2012/0308206 A1 | 12/2012 | Kulas | |
| 2013/0046847 A1 | 2/2013 | Zavesky et al. | |
| 2013/0054728 A1 | 2/2013 | Amir et al. | |
| 2013/0055321 A1 | 2/2013 | Cline et al. | |
| 2013/0188923 A1* | 7/2013 | Hartley | H04N 9/87 386/241 |
| 2013/0259442 A1 | 10/2013 | Bloch et al. | |
| 2013/0282917 A1 | 10/2013 | Reznik et al. | |
| 2014/0040280 A1 | 2/2014 | Slaney et al. | |
| 2014/0078397 A1 | 3/2014 | Bloch et al. | |
| 2014/0082666 A1 | 3/2014 | Bloch et al. | |
| 2014/0129618 A1* | 5/2014 | Panje et al. | 709/203 |
| 2014/0178051 A1 | 6/2014 | Bloch et al. | |
| 2014/0270680 A1 | 9/2014 | Bloch et al. | |
| 2014/0282013 A1 | 9/2014 | Amijee | |
| 2014/0380167 A1 | 12/2014 | Bloch et al. | |
| 2015/0067723 A1 | 3/2015 | Bloch et al. | |
| 2015/0104155 A1 | 4/2015 | Bloch et al. | |
| 2015/0179224 A1 | 6/2015 | Bloch et al. | |
| 2015/0181301 A1 | 6/2015 | Bloch et al. | |
| 2015/0199116 A1 | 7/2015 | Bloch et al. | |
| 2015/0293675 A1 | 10/2015 | Bloch et al. | |
| 2015/0294685 A1 | 10/2015 | Bloch et al. | |

FOREIGN PATENT DOCUMENTS

| | | | |
|---|---|---|---|
| EP | 2104105 A1 | 9/2009 | |
| GB | 2359916 A | 9/2001 | |
| GB | 2428329 A | 1/2007 | |
| JP | 2008005288 A | 1/2008 | |
| WO | WO-00/59224 A1 | 10/2000 | |
| WO | WO-2007/062223 A2 | 5/2007 | |
| WO | WO-2007/138546 A2 | 12/2007 | |
| WO | WO-2008/001350 A2 | 1/2008 | |
| WO | WO-2008/057444 A2 | 5/2008 | |
| WO | WO-2008052009 A2 | 5/2008 | |
| WO | WO-2009/137919 A1 | 11/2009 | |

OTHER PUBLICATIONS

Archos Gen 5 English User Manual Version 3.0, Jul. 26, 2007, pp. 1-81.
International Search Report for International Patent Application PCT/IL2012/000080 dated Aug. 9, 2012 (4 pages).
International Search Report for International Patent Application PCT/IL2012/000081 dated Jun. 28, 2012 (4 pages).
International Search Report for International Patent Application PCT/IL2010/000362 dated Aug. 25, 2010 (2 pages).
Supplemental European Search Report for EP10774637.2 (PCT/IL2010/000362) mailed Jun. 20, 2012 (6 pages).

(56) References Cited

OTHER PUBLICATIONS

Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Yang, H, et al., "Time Stamp Synchronization in Video Systems," Teletronics Technology Corporation, <http://www.ttcdas.com/products/daus encoders/pdf/ tech papers/tp 2010 time stamp video system.pdf>, Abstract, (8 pages).
Barlett, Mitch, "iTunes 11: How to Queue Next Song," *Technipages*, Oct. 6, 2008, pp. 1-8, retrieved on Dec. 26, 2013 from the internet http://www.technipages.com/itunes-queue-next-song.html.
Gregor Miller et al. "MiniDiver: A Novel Mobile Media Playback Interface for Rich Video Content on an iPhoneTM", *Entertainment Computing A ICEC 2009*, Sep. 3, 2009, pp. 98-109.
International Search Report and Writton Opinion for International Patent Application PCT/IB2013/001000 mailed Jul. 31, 2013 (12 pages).
Sodagar, I., (2011) "The MPEG-DASH Standard for Multimedia Streaming Over the Internet", *IEEE Multimedia*, IEEE Service Center, New York, NY US, vol. 18, No. 4, pp. 62-67.
Supplemental European Search Report for EP13184145 dated Jan. 30, 2014 (6 pages).
U.S. Appl. No. 13/622,780, Systems and Methods for Constructing Multimedia Content Modules, filed Sep. 19, 2012
U.S. Appl. No. 13/622,795, Progress Bar for Branched Videos, filed Sep. 19, 2012.
U.S. Appl. No. 13/838,830, Systems and Methods for Synchronization of Selectably Presentable Media Streams, filed Mar. 15, 2013.
U.S. Appl. No. 13/921,536, Systems and Methods for Multiple Device Interaction with Selectably Presentable Media Streams, filed Jun. 19, 2013.
U.S. Appl. No. 14/107,600, Methods and Systems for Unfolding Video Pre-Roll, filed Dec. 16, 2013.
U.S. Appl. No. 12/706,721, the Office Actions mailed Apr. 26, 2012, Aug. 17, 2012, Mar. 28, 2013, Jun. 20, 2013, and Jan. 3, 2014.
U.S. Appl. No. 13/033,916, the Office Actions mailed Jun. 7, 2013 and Jan. 2, 2014.
U.S. Appl. No. 13/034,645, the Office Actions mailed Jul. 23, 2012 and Mar. 21, 2013; and.
U.S. Appl. No. 13/622,780, the Office Action mailed Jan. 16, 2014.
U.S. Appl. No. 14/884,285, System and Method for Assembling A Recorded Composition, Oct. 15, 2015.
U.S. Appl. No. 14/984,821, System and Method for Synchronization of Selectably Presentable Media Streams, filed Dec. 30, 2015.
U.S. Appl. No. 14/509,700, Systems and Methods for Dynamic Video Bookmarking, filed Oct. 8, 2014.
U.S. Appl. No. 14/534,626, Systems and Methods for Parallel Track Transitions, filed Nov. 6, 2014.
U.S. Appl. No. 14/700,845, Systems and Methods for Nonlinear Video Playback Using Linear Real-Time Video Players, filed Apr. 30, 2015.
U.S. Appl. No. 14/700,862, Systems and Methods for Seamless Media Creation, filed Apr. 30, 2015.
U.S. Appl. No. 14/835,857, Systems and Methods for Adaptive and Responsive Video, filed Aug. 26, 2015.
U.S. Appl. No. 14/978,464, Intelligent Buffering of Large-Scale Video, filed Dec. 22, 2015.
U.S. Appl. No. 14/978,491, Seamless Transitions In Large-Schale Vidoe, filed Dec. 22, 2015.
U.S. Appl. No. 15/085,209, Media Stream Rate Synchronization, Mar. 30, 2016.
U.S. Appl. No. 12/706,721, now U.S. Pat. No. 9,190,110, the Office Actions mailed Apr. 26, 2012, Aug. 17, 2012, Mar. 28, 2013, Jun. 20, 2013, Jan. 3, 2014, Jul. 7, 2014, and Dec. 19, 2014; the Notices of Allowance mailed Jun. 19, 2014 and Jul. 17, 2015; the Notices of Allowability mailed Jul. 29, 2015, Aug. 12, 2015 and Sep. 14, 2015.
U.S. Appl. No. 13/033,916, the Office Actions mailed Jun. 7, 2013, Jan. 2, 2014, Aug. 28, 2014, Jan. 5, 2015, Jul. 9, 2015, and Jan. 5, 2016.
U.S. Appl. No. 13/034,645, the Office Actions mailed Jul. 23, 2012, Mar. 21, 2013, Sep. 15, 2014, and Jun. 4, 2015.
U.S. Appl. No. 13/437,164, now U.S. Pat. No. 8,600,220, the Notice of Allowance mailed Aug. 9, 2013.
U.S. Appl. No. 14/060,694, now U.S. Pat. No. 9,271,015, the Office Actions mailed Apr. 27, 2015 and Aug. 31, 2015, the Notice of Allowance mailed Oct. 13, 2015.
U.S. Appl. No. 13/622,780, now U.S. Pat. No. 8,860,882, the Office Action mailed Jan. 16, 2014, the Notice of Allowance mailed Aug. 4, 2014.
U.S. Appl. No. 13/622,795, now U.S. Pat. No. 9,009,619, the Office Actions mailed May 23, 2014 and Dec. 1, 2014, the Notice of Allowance mailed Jan. 9, 2015.
U.S. Appl. No. 13/838,830, now U.S. Pat. No. 9,257,148, the Office Action mailed May 7, 2015, the Notice of Allowance mailed Nov. 6, 2015.
U.S. Appl. No. 13/921,536, the Office Actions mailed Feb. 25, 2015 and Oct. 20, 2015.
U.S. Appl. No. 14/107,600, the Office Actions mailed Dec. 19, 2014 and Jul. 8, 2015.
U.S. Appl. No. 14/335,381, the Office Action mailed Feb. 12, 2016.
U.S. Appl. No. 14/140,007, the Office Action mailed Sep. 8, 2015.
U.S. Appl. No. 14/249,627, the Office Action mailed Jan. 14, 2016.
U.S. Appl. No. 14/534,626, the Office Action mailed Nov. 25, 2015.

* cited by examiner

METHODS AND SYSTEMS FOR IN-VIDEO LIBRARY

FIELD OF THE INVENTION

The present disclosure relates generally to dynamic video playback, and more particularly to methods and systems for presenting a seamless video stream based on user selections of video segments from an in-video library that is maintained in real-time.

BACKGROUND

Over the past decade there has been an exponential growth in the prevalence of streaming media in the lives of the general public. Users frequently listen to streaming music on Internet radio stations such as Pandora, and watch streaming television shows, movies, and video clips on websites such as Hulu, Netflix, and YouTube. Existing video providers like YouTube provide access to a substantial body of video clips; however, there is no easy way to search and manipulate these videos to gather them for later viewing, while at the same time viewing an uninterrupted video stream. Accordingly, users would benefit from a dynamically updated video library that can be provided in parallel with the presentation of a video stream.

SUMMARY

Various implementations of methods and systems are described herein for providing an in-video library that is updated and arranged in real-time during playback of a video stream, and for presenting a seamless video stream to a user based on a selection of video segments from the library.

In one aspect, a system includes a video player programmed to present a video stream to a user. During presentation of the video stream, the video player displays, to the user, at least a portion of a library of selectable prerecorded video segments, and a selection of one or more of the prerecorded video segments from the library is received from the viewer. The video player displays a video segment watch-list that includes the selected prerecorded video segments. The video player then presents to the user the segments in the video segment watch-list as part of the video stream.

In various implementations, the system includes one or more of the following features. A portion of the library can be selected for display to the user based on content presented in the video stream and/or demographic information associated with the user, and/or geographical information associated with the user. During presentation of the video stream, the video player captures a video segment of the video stream and adds the captured video segment to the library. During presentation of the video stream, the video player receives a selection of a video segment in the library and/or the video segment watch-list, and immediately plays the selected video segment. The video player automatically orders the selected prerecorded video segments in the video segment watch-list based at least in part on content of each of the selected prerecorded video segments. Automatically ordering the selected prerecorded video segments includes, for example, identifying a theme of each of the selected segments, and grouping segments having a similar theme in temporal proximity.

In one implementation, during playback of the video stream, the video player receives a selection of additional prerecorded video segments from the library, and for each of the additional prerecorded video segments, the video player determines, based at least in part on content of the additional segment, a location in the video segment watch-list at which to insert the additional segment. The video player then continues, without interruption, the presentation of the video stream which includes the additional prerecorded video segments in the video segment watch-list. Determining the location to insert the additional segment can include identifying a theme of the additional segment, and inserting the additional segment in temporal proximity to other segments in the video segment watch-list that have a similar theme.

In various implementations, the system can include additional features. For example, the prerecorded video segments can be selected from the group consisting of instant replays, news segments, music videos, and commercials. The library of prerecorded video segments can be shared among users, who can be connected via a social network, randomly selected members of the public, or other users having similar demographics and/or viewing histories. The new video segments can, in some cases, be received from users of the system. The video player automatically inserts a transition segment between first and second prerecorded video segments in the video stream, and the segment can be based on at least one of content of the first prerecorded video segment and content of the second prerecorded video segment. The video player overlays at least one of the library and the video segment watch-list on the video stream.

In another aspect, a computer-implement method includes presenting a video stream to a user. During presentation of the video stream, at least a portion of a library of selectable prerecorded video segments is displayed to the user, and a selection of one or more of the prerecorded video segments from the library is received. A video segment watch-list is also displayed, which includes the selected prerecorded video segments. The segments in the video segment watch-list are presented to the user as part of the video stream.

In various implementations, the method includes one or more of presenting a live video broadcast to the user, and, in certain instances, presenting the video stream to the user during presentation of the live video broadcast. The live video broadcast can be any of a sporting event, a newscast, a television show, and an entertainment event.

In some instances, the method further includes automatically determining when an event of interest has occurred in the live video broadcast. The method can further include the steps of providing a notification to the user that the event of interest has occurred, and allowing the user to switch a currently playing video to the live video broadcast.

In other implementations, the method further includes the step of determining the occurrence of the event of interest based on at least one of an audience sound level, a change in score, a change in scene, a change in audio, identified text, and identified speech, and, in some cases, automatically switching to the live broadcast video upon determining that the event of interest has occurred.

In yet another implementation, the method further includes the steps of capturing a video segment of the event of interest, and adding the captured video segment to the library during presentation of the live video broadcast. The live video broadcast can be at least partially hidden to the user during presentation of the video stream.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various implementations of methods and supporting systems for providing an in-video library that is updated and arranged in real-time, during playback of video, and for presenting a seamless video stream to a user based on a selection of video segments from the library.

Figure 1:
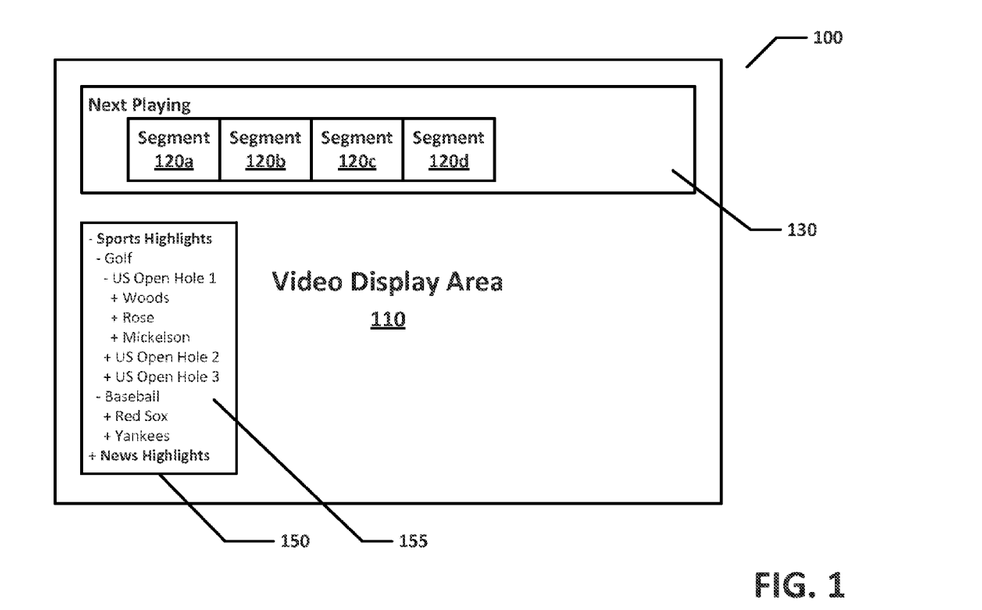
FIG. 1 is an example diagram of a video player.

FIG. 1 depicts one implementation of a video player 100 having a video display area 110, a video segment watch-list 130 and a video library 150. The watch-list 130 and/or the video library 150 can be overlaid on the video display area 110, and a user can interact with these components in real-time as video is played in the video display area 110. Further, the watch-list 130 and/or the video library 150 can be changed in size, moved around the video display area 110, minimized to an interface control (e.g., a button), and/or otherwise manipulated by the user to alter the available viewing area in the video display area 110.

The video display area 110 defines the space in which a video is presented to a user. The video display area 110 can show videos that are selected directly from the watch-list 130 or video library 150, or played automatically from the watch-list 130 (e.g., videos are played one after the other, in the order shown in the watch-list 130). A video shown in the video display area 110 may be manipulated by the user through typical video playback controls (e.g., play, pause, rewind, fast-forward, volume controls, etc.), which may also be overlaid on the video display area 110, or which may be disposed on a different portion of the video player 100.

The watch-list 130 provides an ordered list of audio/video segments 120a-120d to be played in the video display area 110. The segments 120a-120d can be added to the watch-list 130 from the video library 150, further described below. The video player 100 can play each segment in the order it appears in the watch-list 130 and, as one segment completes, the next segment, if any, in the watch-list 130 can be played immediately and seamlessly. For example, the segments 120a-120d in the watch-list 130 can be played as a continuous video stream, such that no noticeable delay or buffering occurs between the segments 120a-120d and no user interaction is required to continue playing subsequent segments. To avoid interruptions in the video stream, intelligent buffering and progressive downloading of the video, audio, and/or other media content can be performed as described in U.S. patent application Ser. No. 13/437,164, filed Apr. 2, 2012, and entitled "Systems and Methods for Loading More Than One Video Content at a Time," the entirety of which is incorporated by reference herein. For example, upcoming video segments in the watch-list 130 can be downloaded at least in part prior to presentation to the user, so that the video stream can proceed smoothly from one segment to the next, and also so that the user can jump immediately to a particular segment by selecting it in the watch-list 130. In other cases, the video player 100 can begin downloading segments upon their selection in the watch-list 130 or library 150, but the transition to playback of the segment will occur only after enough of the video has been buffered to allow for uninterrupted playback.

There can also be smooth graphical transitions between segments (e.g., a fade effect). In other implementations, the video player 100 can add intelligent transitions between two or more segments. For example, if the watch-list 130 contains a golf highlight video segment followed by a basketball highlight video segment, the video player 100 can insert one or more audio and/or video transitions between the segments based on the preceding segment (golf), the subsequent segment (basketball), or both. For instance, a video segment may be inserted in which a sports announcer says, "And that's it for today's golf highlights—now, basketball."

The watch-list 130 can include visual representations of the list of segments 120a-120d, for example, video frame thumbnails, icons, textual descriptors, or other identifiers. The watch-list can also display visual representations of previously played audio/video segments or a currently playing audio/video segment. The user can scroll through the watch-list using an input device (e.g., mouse, touchpad, motion detector, etc.) to see visual representations of segments (previously played and upcoming, if any) that do not fit in the watch-list 130 display area. The user can also use the input device to manipulate the watch-list, for example, to reorder the segments 120a-120d, remove one or more of the segments 120a-120d, insert a segment from the video library 150 into a particular location in the watch-list 130, and select a segment to be instantly played or replayed. Any of these operations can be performed while a video is playing in the video display area 110, and playback of the video segments 120a-120d can change to reflect modifications made to the watch-list 130.

In some implementations, when audio/video segments are added to the watch-list 130, the segments are automatically ordered based on factors such as, e.g., the content of one or more of the segments, metadata associated with one or more of the segments, the date the segments were added to the library, segment length, segment title, and so on. The newly added segments (or segment) can be ordered and inserted into an appropriate place in the watch-list 130 based on one or more of the foregoing factors. In some cases, some or all of the segments currently in the watch-list 130 can be reordered to correspond with the method used to order the newly added segments.

Segments added to or existing in the watch-list 130 can be ordered by an identified theme of one or more of the segments. For example, a user selects, for addition to the watch-list 130, a mix of sports highlights from the video library 150, including a hole-in one by Jim Furyk and a long putt by Phil Mickelson in the U.S. Open golf tournament, a game winning touchdown in a Patriots-Giants football game, a penalty kick in a World Cup match between Italy and Spain, and a Hail Mary pass by Ben Roethlisberger in a Steelers-Packers football game. The video player 100 can reorder the segments in the watch-list 130 by theme (in this case, by sport), and place the segments having the same or similar themes in temporal proximity. As a result, the user is presented with a seamless video stream of highlight segments grouped by sport (e.g., first, the two golf segments, then the two football segments, and finally, the soccer segment).

A similar reordering and segment insertion process can be performed if the user adds segments to a watch-list 130 that already contains segments. This process can be performed in real-time, while the video player 100 is presenting video segments from the watch-list 130 to the user. Thus, during playback of the video stream of video segments in the watch-list 130, the user can select one or more additional prerecorded video segments from the library 150 and, for one or more of the additional segments, the video player 100 can determine an appropriate location in the watch-list at which to insert the segment. The appropriate location can be determined based on factors such as, e.g., the content of the segment and/or other segments in the watch-list, metadata associated with one or more of those segments, the date those segments were added to the library, segment length, segment title, and so on. Referring back to the sports highlight example above, while the highlight video stream is playing, the user selects an additional World Cup video segment. The video player 100 can then identify the theme of the segment (soccer), and insert the segment in temporal proximity (e.g., near or next) to other segment(s) having the same or similar theme (e.g., the other soccer segment) in the watch-list (assuming the other segment(s) not already been played). If there is no appropriate place to insert an added segment, the video player 100 can insert the segment into a default position in the watch-list 130, such as the end.

The video library 150 includes a collection of prerecorded audio/video segments that can be immediately played or added to the watch-list 130 for playback in the video display area 110. The audio/video segments can include any type of content, including, but not limited to, instant replays, news segments, music videos, and commercials. The video library 150 can provide visual representations (e.g., video frame thumbnails, icons, textual descriptors, or other identifiers) of the segments that can be manipulated by the user (e.g., in index form, as further described below). To add a segment to the watch-list 130, a user can, e.g., drag the associated visual representation into the watch-list 130, double-click the visual representation, etc. In some instances, a user can play an audio/video segment from the library immediately, with or without adding it to the watch-list 130. Other ways for a user to select a video segment from the library 150 can include browsing the index 155, jumping to a particular event (e.g., the first goal in a soccer game), jumping to a time (e.g., fifteen minutes into a news broadcast), and searching for an event by type, person, or other metadata (e.g., the name of an athlete, city, content category, etc.).

As one example, shown in FIG. 1, the video library 150 includes an index 155, that is, a structured list of some or all of the topics that exist in the library. The user can interact with and browse through the library 150 by, for example, expanding and collapsing the topic folders in the index 155, using search functionality (e.g., search by name, metadata, tag, keyword, or other criteria) to filter the items in the index 155, and/or by selecting options presented by the video player 100 (e.g., suggested video segments to watch based on previous selections made by the user and/or other users). The items in the index 155 can be arranged in a hierarchical structure, with topics becoming more specific as the user drills down into subfolders. In FIG. 1, the example index 155 includes topics for "Sports Highlights" and "News Highlights." The "Sports Highlights" topic is expanded, showing "Golf" and "Baseball," which are further expanded as shown. The user can select audio/video segments for immediate playback or for adding to the watch-list 130 using the index 155. For example, the video library 150 can contain all of the shots made by each player in a golf tournament. Using the index 155, the user can select which particular shots, holes, players, etc. to add to the watch-list 130 for viewing. If the user selects multiple segments for playback at once (e.g., by selecting a folder having multiple items within), all of the segments can be added to the watch-list (and, in some cases, one of the segments can be played immediately in the video display area 110). The user can interact with the video library 150 and index 155 as described herein in real-time while a video is playing in the video display area 110.

In one implementation, based on one or more factors, the video library 150 and/or index 155 displayed to the user by the video player 100 includes only a portion of the available segments in the library 150 and/or topics in the index 155, respectively. The factors can include attributes associated with the user, such as geographical information (e.g., location, country, etc.), demographic information (e.g., age, income range, etc.), weather, time, date, videos previously watched or currently being watched by the user, videos previously watched or currently being watched by other users, videos in the watch-list 130 of the user or other users, social networking information (e.g., the user's friends, likes, group associations, etc.), and the like. The index 155 can be sorted based on one or more of the factors, for example, to put audio/video segments that may be more relevant to the user at or near the top of the index 155. In another case, the video player 100 makes video segment recommendations to the user based on one or more of the factors. Recommended videos can be played immediately or added to the watch-list (automatically or on selection by the user). In one example, the video player 100 changes the display of the library 150 and/or suggests particular video segments based on content currently being played, e.g., if a player commits a foul in a soccer game, the video player 100 can suggest video segments in the library 150 that show previous fouls in the game, previous fouls by the player, and other related segments.

In some implementations, the video library 150 and the index 155 are updated in real-time as audio/video segments are added to or removed from the library 150 (via automated methods and/or manual user input). Using manual methods, a user can upload prerecorded audio/video segments to the library 150 or, while a video stream is playing in the video display area 110, the user can capture a portion of the stream and add it to the library 150 as a video segment, using controls or other interface elements on the video player 100. The user can tag the video segment or manually sort it into an appropriate place in the index 155.

With respect to automated methods, the video player 100 can be configured to automatically capture a portion of a playing video stream and add it as a segment to the video library 150. Events of interest can be automatically captured by the video player 100. Events of interest can include, for example, a homerun in a baseball game, a breaking news story, a song during a concert, and so on. The video player 100 can detect when an event of interest has occurred and begin capturing video at that time, or slightly before (the video player 100 can maintain a buffer for video already viewed, allowing it to capture video 5 seconds, 10 seconds, 30 seconds, etc. before the event occurrence). The video player 100 can detect when an event of interest has occurred based on, for example, audience sound level or reaction (e.g., cheers, laughter) a change in score (e.g., in a sports game), a change in scene (e.g., a change to a commercial), a change in audio (e.g., a change in music), identified text (e.g., keywords detected by optical character recognition), and identified speech (e.g., keywords detected by voice recognition).

The video player 100 can stop capturing video automatically by detecting an end to the event, or it can stop capturing video after an amount of time, which may vary based on the video stream content (e.g., instant replays in sports may only require around 20 seconds of video, whereas a song in a concert may require video capture of several minutes). In some circumstances, user input can be necessary to direct the video player 100 to continue or to stop capturing video. Automatically captured segments can also be automatically sorted in the index 155. For example, the video player 155 can sort captured segments based on their content, metadata associated with the video stream, or other suitable attributes that can be detected or evaluated.

The video library 150 may be unique to each user, or it may be shared by multiple users (e.g., individuals, applications, organizations, and/or other entities). For a video library 150 that is shared, some or all of the sharers can have the ability to modify the library 150; e.g., by adding/removing segments, modifying metadata associated with segments, sorting segments in the index 155. As changes are made to the library 150 by one sharer, the changes can be reflected in real-time to the other sharers. For example, a video library can be shared by a university professor and students in a class taught by the professor. The professor may have full access to the library (e.g., read/write/modify), while the students have only the ability to view the videos in the library. After each class, the professor adds a video recording of the lecture to the shared library and indexes it appropriately. Immediately thereafter, the video segment can be accessed by the students through their instances of the shared video library.

Figure 2:
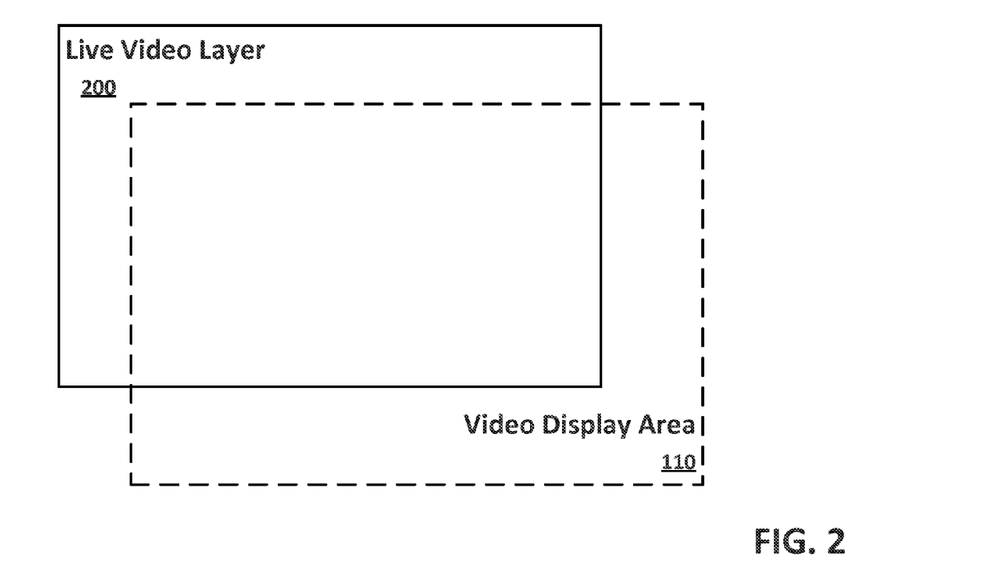
FIG. 2 is an example diagram of a video player with a live video layer.

In some implementations, the video player 100 can present a live broadcast video stream (e.g., a sporting event, a newscast, a television show, an entertainment event, and the like) simultaneously with or instead of prerecorded audio/video segments. Referring to FIG. 2, in one implementation the video player 100 includes a live video layer 200 that can be disposed behind or in front of the video display area 110, or can be hidden entirely, e.g., when prerecorded audio/video segments are being played in the video display area 110. One or more of the live video layer 200 and the video display area 110 can be partially or fully hidden or transparent, or can be resized or moved with respect to each other. For example, when the user selects a video segment(s) for playback from the library 150, the live video layer 200 can become transparent until the video segment(s) have completed playback, at which point the video player 100 can transition back to the live broadcast video stream on the live video layer 200.

The live video layer 200 can also occupy a portion of the video display area 110 during simultaneous playback of a live broadcast and prerecorded video segments such that a user can view both at once, similar to a picture-in-picture display. Alternatively or additionally, the live broadcast layer 200 can be displayed in a separate window or device (e.g., the live broadcast layer 200 is shown on an iPad® tablet while prerecorded video segments are shown on a laptop computer). In some implementations, one device can serve as an input device to control the video player 100, while another device operates as an output device to display video. Interactions between multiple video playback devices can be performed as described in U.S. patent application Ser. No. 13/921,536, filed Jun. 19, 2013, and entitled "Systems and Methods for Multiple Device Interaction with Selectably Presentable Media Streams," the entirety of which is incorporated by reference herein. When the live video layer 200 and/or the video display area 110 is hidden or made inactive, the audio playing in the hidden/inactive screen can be automatically muted or reduced in volume. In other implementations, the audio on the hidden/inactive screen can continue to play while audio on the visible/active screen is muted or reduced in volume.

The watch-list 130, video library 150, and/or user interface elements can be fully or partially visible at all times on one or both of the live video layer 200 and the video display area 110, or can appear when active and then disappear after a delay. User interface elements can include, but are not limited to, audio/video playback controls, volume controls, selectable options, indexes, tables, images, statistics, and so on. For example, one interface element can present a current score and other notable information for a sporting event being played on the live video layer 200. This interface element can remain visible to the user even when watching prerecorded video segments in the video display area 110. The video player 100 can also include a dynamic progress bar that shows the duration of a prerecorded segment and the time that the segment was originally recorded. The video player 100 can also include social networking and voting integration so that the user can rate and comment on video segments, as well as recommend video segments to other users.

As described above, the video player 100 can detect when an event of interest has occurred in a video stream. If an event of interest occurs in a live broadcast stream while it is partially or fully hidden (e.g., if the user is watching prerecorded video segments on the video display area 110), the video player 100 can notify the user (e.g., using on-screen graphical or textual elements) of the event of interest and automatically display at least a portion of the live video layer 200, or prompt the user to do so. The video player 100 can also automatically capture events of interest in the live broadcast, as well as allow a user to manually capture video segments in the live broadcast, and add captured segments to the video library 150 in real-time, as discussed above. For example, as a user is browsing news segments in the video library 150, recent news segments can be added, causing the library 150 to be dynamically updated and the segments to be made available to the user. If the user switches to the live video stream, a video segment playing in the video display area 110 can be paused or bookmarked to allow the user to resume playback at the same point. In some implementations, while the live video layer 200 is hidden or inactive, the live broadcast stream can be paused, delayed, or saved in a buffer so that the user can catch up on missed content (e.g., during a commercial, the video player 100 can skip ahead to the current live broadcast time).

Figure 3:
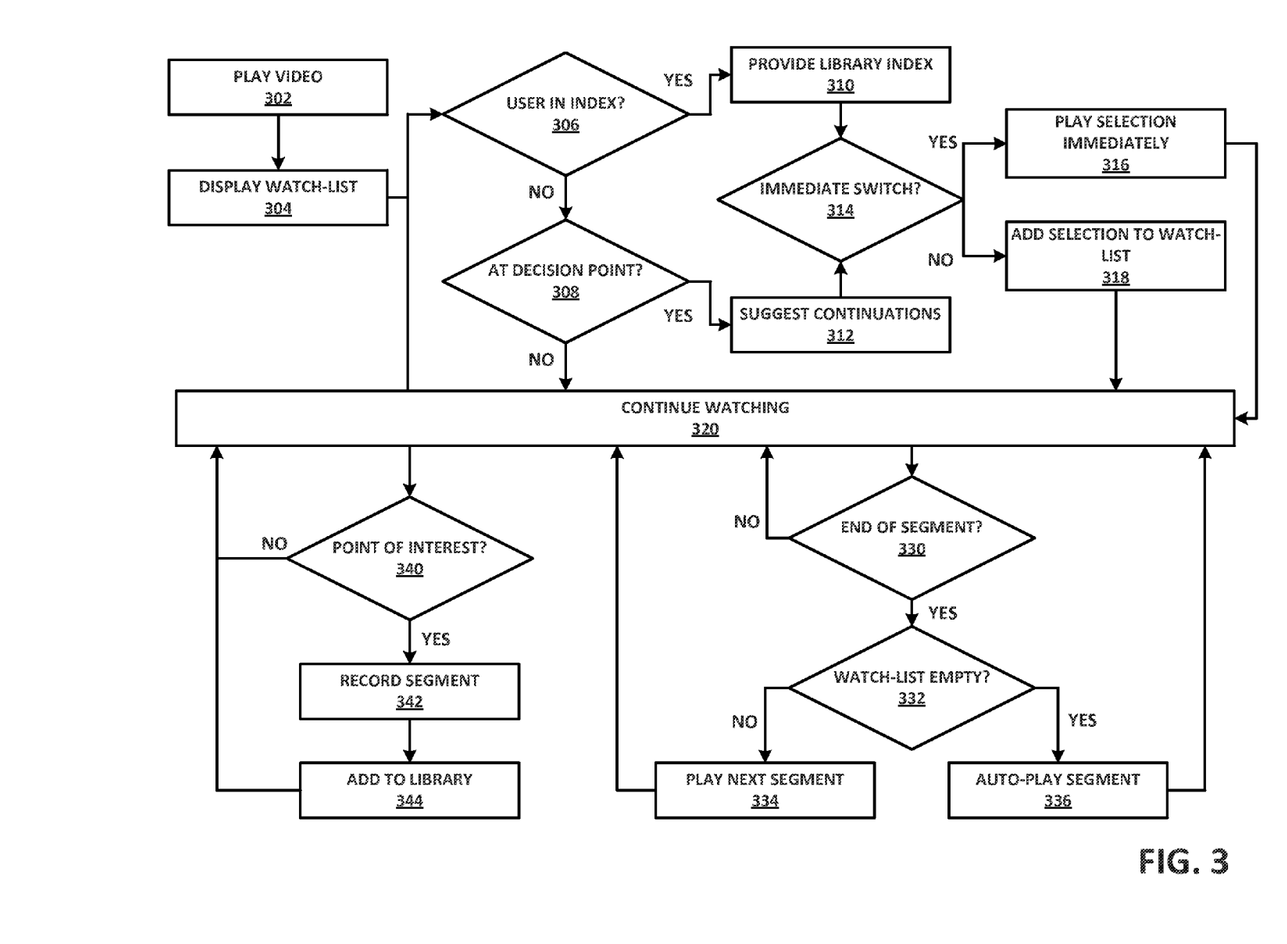
FIG. 3 is an example flowchart of a method for presenting an in-video library.

Referring now to FIG. 3, in one implementation, a method for presenting a video stream to a user includes a video player 100 that presents a video stream to a user (STEP 302). During presentation of the video stream, the video player 100 displays a watch-list of video segments to be played for the user (STEP 304). The video segments to be played can be selected from a library of selectable prerecorded video segments. The library can be displayed in whole or in part to the user, and can include an index that the user can browse to find video segments of interest. At STEP 306, a determination is made as to whether the user has entered the library index and, if so, the index is presented to the user (STEP 310). If the user has not entered the library index, a determination is made as to whether the user has reached a decision point and/or entered a decision period in the currently playing video segment (STEP 308). If a decision point or period has not been reached, the video stream continues to play for the user (STEP 320).

Upon reaching a decision point or period, the user may be provided with one or more video segment options for continuing the video stream (STEP 312). For example, the video player 100 may suggest a number of different segments based on the currently playing segment (e.g., if the user is watching golf highlights, the player suggests other golf-related video segments). The video player 100 may also provide video segment options that seamlessly connect or transition from the playing segment, as further described herein. After providing the library index (STEP 310) or suggesting video segment continuations (STEP 312), the video player 100 can receive a selection of a video segment to be played (e.g., from the library or one of the suggested segments). If the user selects the segment for immediate playback (STEP 314), the selection is played immediately (STEP 316). Otherwise the selected segment is added to the watch-list (STEP 318). In both cases, the user can then continue watching the video stream (STEP 320).

Other operations can occur during playback of the video stream. Referring still to FIG. 3, if the end of a video segment has been reached (STEP 330), the watch-list is evaluated to determine whether there are further segments for playback (STEP 332). If there is at least one segment in the watch-list, the next segment is played (STEP 334) and the user can continue to watch the video stream (STEP 320). If the watch-list is empty, the video stream can stop or the video player 100 can suggest video segments for playback to the user. The video player 100 can also automatically select and play video segments (STEP 336), e.g., based on the previously played segments, user attributes, or other factors as described herein.

In STEP 340, a point of interest is reached in the video stream. The point of interest can refer to an event of interest (e.g., score change, musical number, etc.) that is automatically detected or manually tagged by a user. If no point of interest is reached, the video stream continues to play (STEP 320). Otherwise, the interesting event can be recorded automatically or manually (STEP 342), and the captured video segment can be added to the video library (STEP 344).

Figure 4:
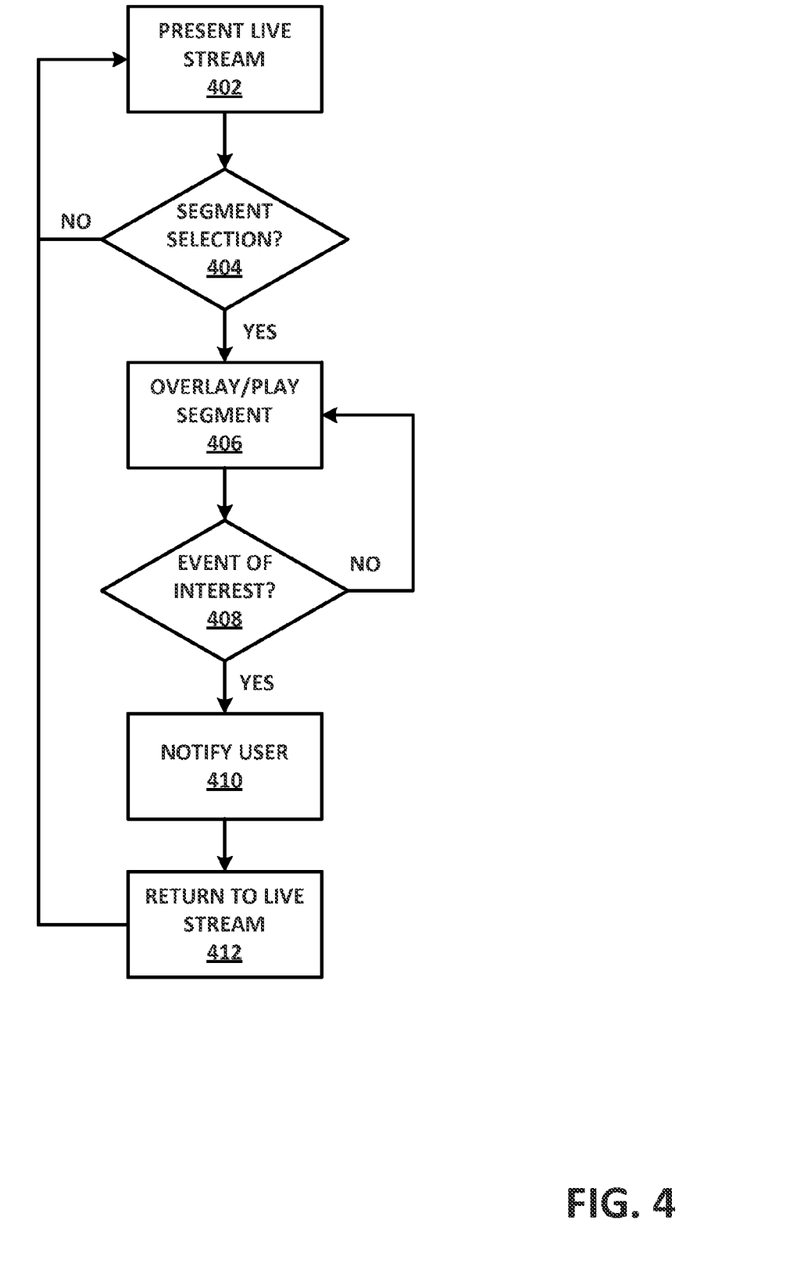
FIG. 4 is an example flowchart of a method for presenting live video.

Referring to FIG. 4, in one implementation, a method for presenting a live video stream to a user includes presenting, by a video player, a live broadcast video stream (STEP 402). If a selection of a prerecorded video segment is received from the user (STEP 404), the video player presents the segment partially or fully overlaid on the live video (STEP 406). If an event of interest in the live video occurs during playback of the prerecorded video segment (STEP 408), the user is notified of the occurrence (STEP 410). Otherwise, playback of the segment continues until completion. After notification of the event of interest (STEP 410), the user can return to the live broadcast video stream (STEP 412).

In one implementation, the present system includes two types of users: viewers and editors. Viewers can use the video player 100 to watch seamlessly connected, prerecorded video segments. Editors can use the video player 100 to record and capture streaming video segments and add them to the video library 150. A user can be both an editor and a viewer. Before and during video playback (live or prerecorded video stream), editors can add video segments to a shared library 150 that can viewed by the editor and/or by other users. A live video editor can add segments recorded before a live event, such as interviews or previously occurring events. For example, after a homerun that occurs during the live broadcast of a baseball game, the live video editor can add video segments showing previous homeruns by the same player, or an interview in which the player predicts that he will hit another homerun. A live video editor can also add segments captured during a live event (e.g., instant replays). Segments added by the live video editor can also be inserted into the video streams of users while the live broadcast is being presented.

Figure 5A:
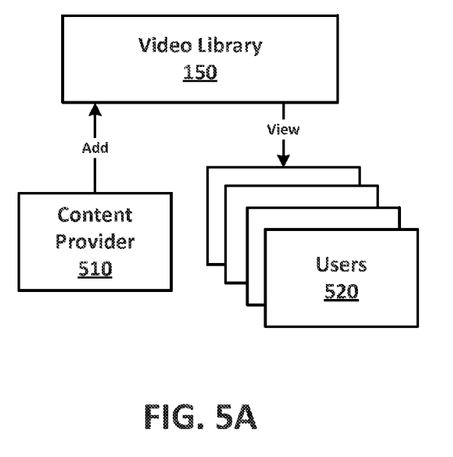
FIGS. 5A-5D are example diagrams of editor and user interactions with a video library.
Figure 5B:
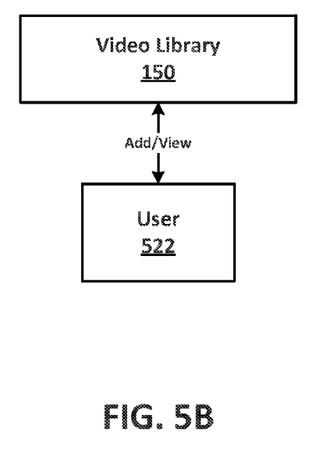
Figure 5C:
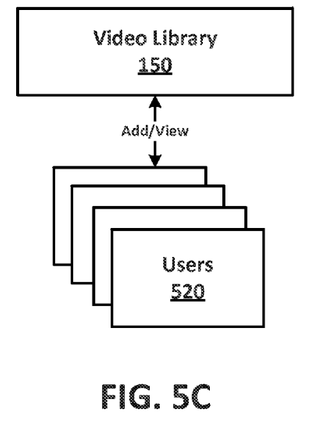
Figure 5D:
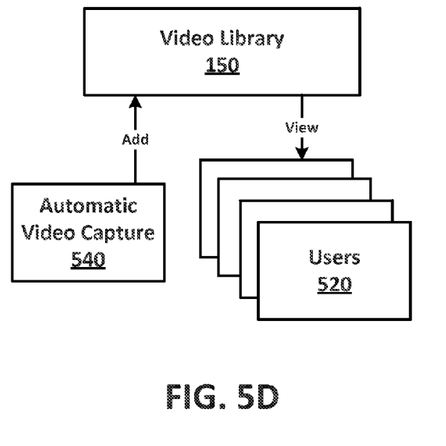

FIGS. 5A-5D depict various examples of editors and their interactions with the video library 150. In FIG. 5A, a content provider 510 can add video segments to the video library 150 for later viewing by users 520. For example, when a content provider, such as a broadcast company, creates a segment to be added to the library 150, it can be creating the same or similar footage that it would use for a standard broadcast stream. In FIG. 5B, a user 522 acts as both a viewer and editor by creating video segments himself and adding them to the video library 150, and viewing the created segment or other segments from the library 150. In FIG. 5C, a group of users 520 shares the video library 150 and views the same video stream together. When one of the users 520 creates a segment, it can appear in the shared library 150 for selection and viewing by all users of the group 520. FIG. 5D represents the situation in which the system is an automated editor 540; that is, interesting events are automatically identified, recorded, and added as video segments to the library for viewing by users 520.

When an editor creates a new video segment he can control various attributes and features associated with the segment, such as start point (e.g., start recording immediately or a number of seconds earlier in order to capture from the beginning of an event of interest), end point, title, and other metadata (e.g., persons in the video, type of event, etc.). The editor can also categorize or tag the segment, e.g., by associating it with a sports team, player name, topic, and so on. The editor can perform basic video editing operations, such as trimming and pacing the segment, combining segments or portions of segments, selecting angles to display, adding transitions between segments, adding music or other audio, and adding graphical effects. The editor can also add user interface elements to a captured video segment, such as links, social networking sharing buttons, voting buttons, and the like. Any or all of these editor operations can be automated in full or in part. In some implementations, a video library can be associated with a particular editor such that the library includes segments created by the editor. Users can search for segments by a particular editor, and view, rate, and comment on each segment or editor. The system can also use Google+, Facebook, or other social networks to provide users with segments or editors having content that can be viewed.

In some implementations, the video player 100 tracks data regarding user interactions, users, and/or player devices, and provides the data to an analytics server. Collected analytics can include, but are not limited to: the number, type, and/or location of a device; user data, such as login information, name, address, age, sex, and the like; user interactions, such as button/touchpad presses, mouse clicks, mouse/touchpad movements, interaction timings, and the like; and decisions made by users or automatically (e.g., video segments watched). The analytics can include those described in U.S. patent application Ser. No. 13/034,645, entitled "System and Method for Data Mining within Interactive Multimedia," and filed Feb. 24, 2011, the entirety of which is incorporated by reference herein.

The present system offers a multitude of uses. In one example, several users watch the same live sporting event, and each user can capture and edit events of interest and share the resulting video segments with each other through a shared video library. In another example, a content provider creates an edited video segment of a soccer goal from different angles and either inserts it into a live broadcast video stream viewed by multiple users, or adds it to a shared video library so that the users can choose when to view the segment. In yet another example, during a live event or prerecorded video stream, an editor can insert commercials into the video stream or add them to a shared library, and configure the video player 100 to reward users that watch the commercial. As a further example, during a live concert or standup comedy show, segments can be captured for each song or joke, and users can watch the segments again by selecting them from the video library. In another example, during a videoconference call a user can save parts of the conversation as segments, and then use the segments to create a video summary of the meeting.

The present techniques can also be used in conjunction with seamlessly assembled and selectably presentable multimedia content, such as that described in U.S. patent application Ser. No. 13/033,916, filed Feb. 24, 2011, and entitled "System and Method for Seamless Multimedia Assembly," and U.S. patent application Ser. No. 14/107,600, filed Dec. 16, 2013, and entitled "Methods and Systems for Unfolding Video Pre-roll," the entireties of which are incorporated by reference herein. The prerecorded video segments can be selectably presentable multimedia content and can include, for example, one or more predefined, separate multimedia content segments that are combined to create a continuous, seamless presentation such that there are no noticeable gaps, jumps, freezes, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the segment itself.

If a viewer does not make a selection at a decision point or during a decision period, a default or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments form a seamless multimedia content path, and there can be multiple paths that a user can take to experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the multimedia content along a content path can be performed by selecting among options that appear on and/or around the video while the video is playing. In some implementations, these options are presented to users at a decision point and/or during a decision period in a content segment. The display can hover and then disappear when the decision period ends or when an option has been selected. Further, a countdown or other visual, aural, or other sensory indicator can be presented during playback of content segment to inform the user of the point by which he must make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

Users can interact with the video player 100 through various input devices, such as desktop computers, laptops, televisions, smartphones, smart glasses, cellular phones, tablets, gaming devices, DVD players, media players, set-top boxes, and a device having a suitable input interface such as a keyboard, mouse, trackball, touchpad, touchscreen, remote control, eye tracker, motion tracker, microphone, and the like. The video player 100 presents video streams to users via output devices, such as desktop computers, laptops, televisions, smartphones, cellular phones, tablets, smart glasses, gaming devices, DVD players, media players, set-top boxes, and/or any devices having a suitable visual display, audio, and/or other sensory output interface such as a display screen, projector, speaker, and the like. A single device can perform both input and output functions. For example, a smartphone can allow a user to provide input using a touchscreen, while viewing video on the display screen of the phone. Alternatively, a single device can have both input and output capabilities, but may be used for only input or output. For example, the smartphone can be used as an input device to interact with a video that is being played on a television.

More generally, the functions provided by the video player 100 can be implemented in any appropriate hardware or software. If implemented as software, the invention can execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

Some or all of the described functionality can be implemented in software downloaded to or existing on the user's device. Some of the functionality can exist remotely; for example, video encoding functions can be performed on one or more remote servers. In some implementations, the user's device serves only to provide output and input functionality, with the remainder of the processes being performed remotely.

The local and/or remote software can be implemented on hardware such as a smart or dumb terminal, network computer, personal digital assistant, wireless device, smartphone, tablet, television, gaming device, music player, mobile telephone, laptop, palmtop, wireless telephone, information appliance, workstation, minicomputer, mainframe computer, or other computing device, that is operated as a general purpose computer or a special purpose hardware device that can execute the functionality described herein. The software can be implemented on a general purpose computing device in the form of a computer including a processing unit, a system memory, and a system bus that couples various system components including the system memory to the processing unit.

The described systems can include a plurality of software processing modules stored in a memory and executed on a processor in the manner described herein. The program modules can be in the form of a suitable programming languages, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, the devices include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the client manually requests a web page from the server. Alternatively, the device automatically makes requests with the web browser. Examples of commercially available web browser software are Microsoft® Internet Explorer®, Mozilla® Firefox®, and Apple® Safari®.

In some implementations, the devices include client software. The client software provides functionality to the device that provides for the implementation and execution of the features described herein. The client software can be implemented in various forms, for example, it can be in the form of a web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a "plug-in" to the web browser or to another framework or operating system. Any other suitable client software architecture, including but not limited to widget frameworks and applet technology can also be employed with the client software.

A communications network can connect the devices with one or more servers and/or with each other. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications, and HTTP/HTTPS requests made by a web browser, and the connection between the clients and servers can be communicated over such TCP/IP networks. The type of network is not a limitation, however, and any suitable network can be used.

It should also be noted that implementations of the present invention can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A system comprising:
a video player programmed to perform operations comprising:
presenting a video stream to a user for viewing by the user, the video stream comprising a predefined path of prerecorded video segments;
during presentation of the video stream:
displaying, to the user viewing the video stream, at least a portion of a library of selectable prerecorded video segments;
receiving, from the user viewing the video stream, a selection relating to one or more of the prerecorded video segments from the library;
adding, based on the selection, the one or more prerecorded video segments to a video segment watch-list;
identifying a decision point in the predefined path, the decision point comprising a location at which the video stream can transition to one of a next prerecorded video segment in the predefined path and a segment in the video segment watch-list; and
inserting at least one segment from the watch-list into the video stream at the decision point, wherein the at least one inserted segment comprises the one or more prerecorded video segments that were added to the watch-list based on the selection received from the user viewing the video stream; and
presenting, to the user viewing the video stream, the at least one inserted segment as part of the video stream; and
continuing presentation of the predefined path of prerecorded video segments after the presentation of the at least one inserted segment.

2. The system of claim 1, wherein the portion of the library is selected for display to the user based on content presented in the video stream.

3. The system of claim 1, wherein the portion of the library is selected for display to the user based on at least one of demographic information associated with the user and geographical information associated with the user.

4. The system of claim 1, wherein the operations further comprise, during presentation of the video stream:
capturing a video segment of the video stream; and
adding the captured video segment to the library.

5. The system of claim 1, wherein the operations further comprise:
during presentation of the video stream, receiving a selection of a video segment in at least one of the library and the video segment watch-list; and
immediately playing the selected video segment.

6. The system of claim 1, wherein the operations further comprise:

automatically ordering the selected prerecorded video segments in the video segment watch-list based at least in part on content of each of the selected prerecorded video segments.

7. The system of claim 6, wherein automatically ordering the selected prerecorded video segments comprises:
identifying a theme of each of the selected segments; and
grouping segments having a similar theme in temporal proximity.

8. The system of claim 1, wherein the operations further comprise:
during playback of the video stream:
receiving a selection of one or more additional prerecorded video segments from the library; and
for each of the additional prerecorded video segments, determining, based at least in part on content of the additional segment, a location in the video segment watch-list at which to insert the additional segment; and
continuing, without interruption, presentation of the video stream including the one or more additional prerecorded video segments in the video segment watch-list.

9. The system of claim 8, wherein determining the location to insert the additional segment comprises:
identifying a theme of the additional segment; and
inserting the additional segment in temporal proximity to other segments in the video segment watch-list having a similar theme.

10. The system of claim 1, wherein the prerecorded video segments are selected from the group consisting of instant replays, news segments, music videos, and commercials.

11. The system of claim 1, wherein the library of prerecorded video segments is shared among a plurality of users.

12. The system of claim 11, wherein the new video segments are received from at least one user of the plurality of users.

13. The system of claim 1, wherein the operations further comprise automatically inserting a transition segment between first and second prerecorded video segments in the video stream.

14. The system of claim 13, wherein the transition segment is selected for insertion based on at least one of content of the first prerecorded video segment and content of the second prerecorded video segment.

15. The system of claim 1, wherein the operations further comprise overlaying at least one of the library and the video segment watch-list on the video stream.

16. A computer-implemented method comprising:
presenting a video stream to a user for viewing by the user, the video stream comprising a predefined path of prerecorded video segments;
during presentation of the video stream:
displaying, to the user viewing the video stream, at least a portion of a library of selectable prerecorded video segments;
receiving, from the user viewing the video stream, a selection relating to one or more of the prerecorded video segments from the library;
adding, based on the selection, the one or more prerecorded video segments to a video segment watch-list;
identifying a decision point in the predefined path, the decision point comprising a location at which the video stream can transition to one of a next prerecorded video segment in the predefined path and a segment in the video segment watch-list; and
inserting at least one segment from the watch-list into the video stream at the decision point, wherein the at least one inserted segment comprises the one or more prerecorded video segments that were added to the watch-list based on the selection received from the user viewing the video stream; and
presenting, to the user viewing the video stream, the at least one inserted segment as part of the video stream; and
continuing presentation of the predefined path of prerecorded video segments after the presentation of the at least one inserted segment.

17. The method of claim 16, further comprising:
presenting a live video broadcast to the user; and
wherein the video stream is presented to the user during presentation of the live video broadcast.

18. The method of claim 17, wherein the live video broadcast comprises at least one of a sporting event, a newscast, a television show, and an entertainment event.

19. The method of claim 18, further comprising automatically determining when an event of interest has occurred in the live video broadcast.

20. The method of claim 19, further comprising:
providing a notification to the user that the event of interest has occurred; and
allowing the user to switch a currently playing video to the live video broadcast.

21. The method of claim 20, further comprising determining the occurrence of the event of interest based on at least one of an audience sound level, a change in score, a change in scene, a change in audio, identified text, and identified speech.

22. The method of claim 20, further comprising automatically switching to the live broadcast video upon determining that the event of interest has occurred.

23. The method of claim 20, further comprising, during presentation of the live video broadcast:
capturing a video segment of the event of interest; and
adding the captured video segment to the library.

24. The system of claim 17, wherein the live video broadcast is at least partially hidden to the user during presentation of the video stream.

\* \* \* \* \*